Inventors:
Clyde P. Baldwin.
Harry H. Vanderzee.
by
Paul A. Maxson.
Atty.

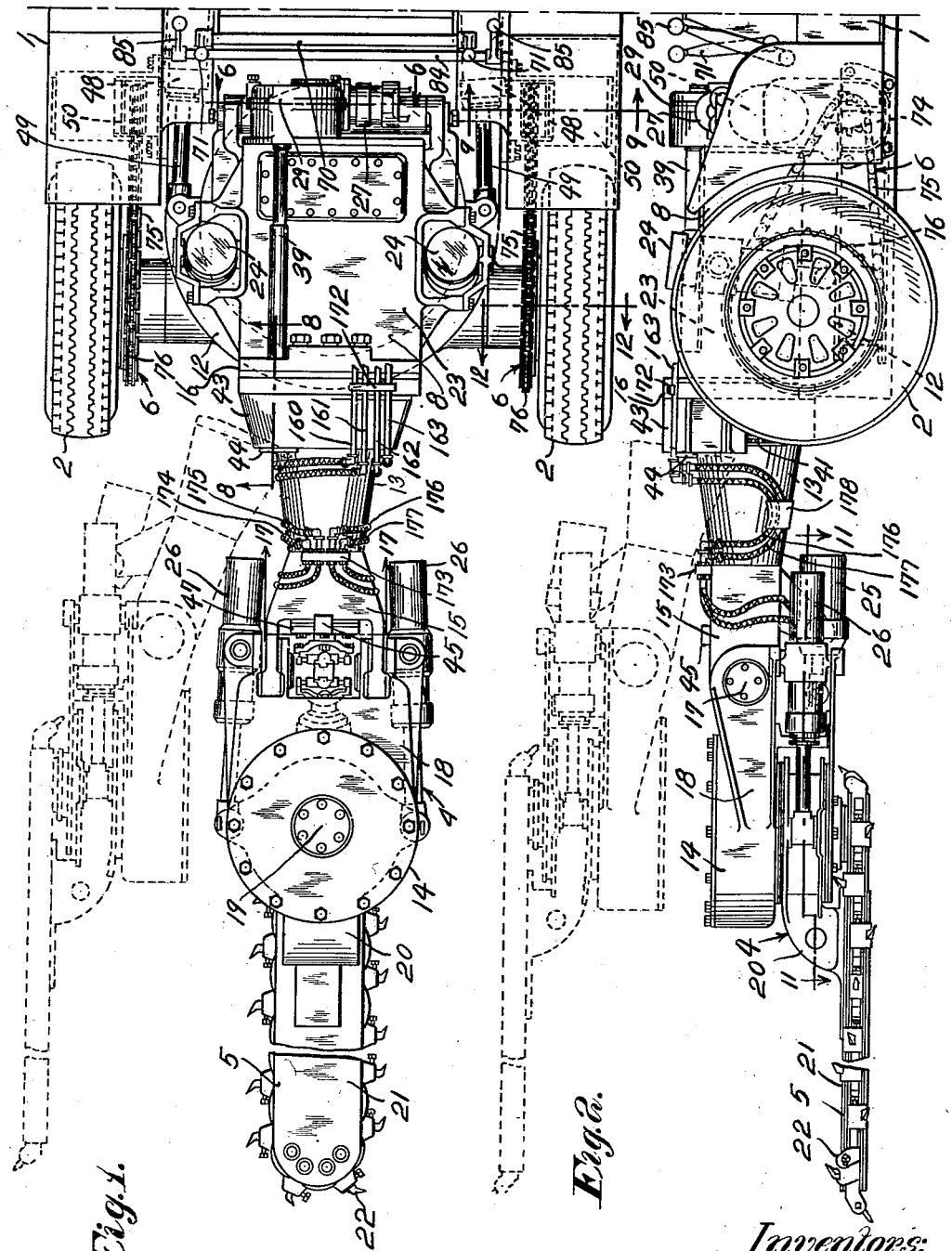

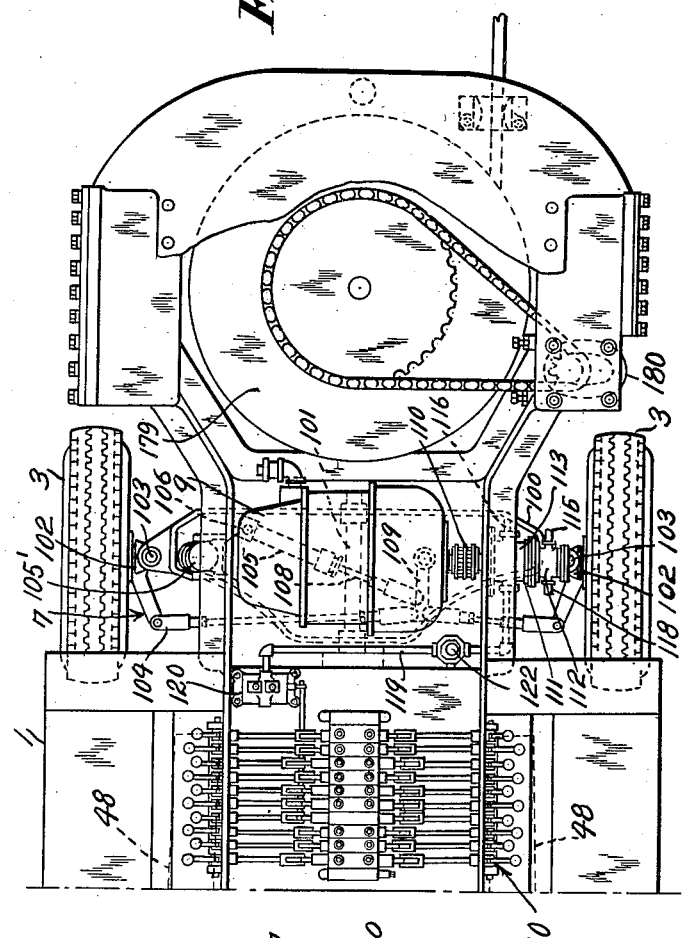

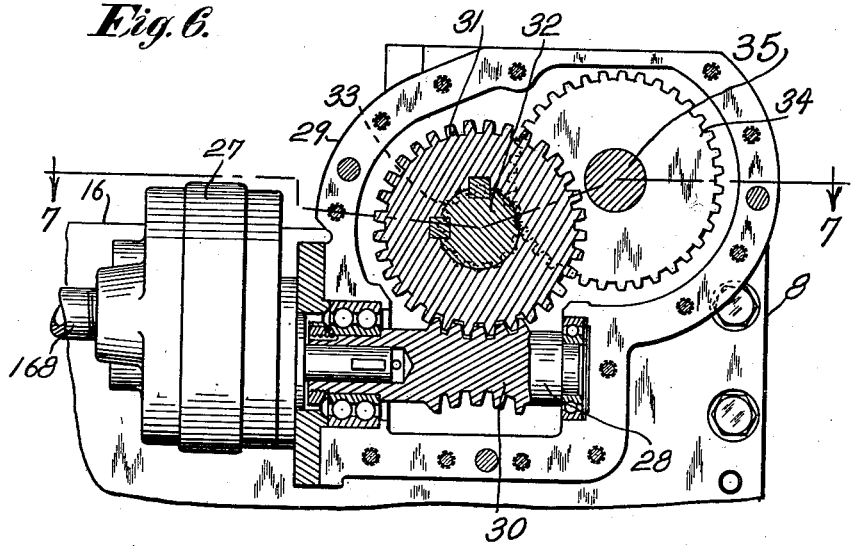
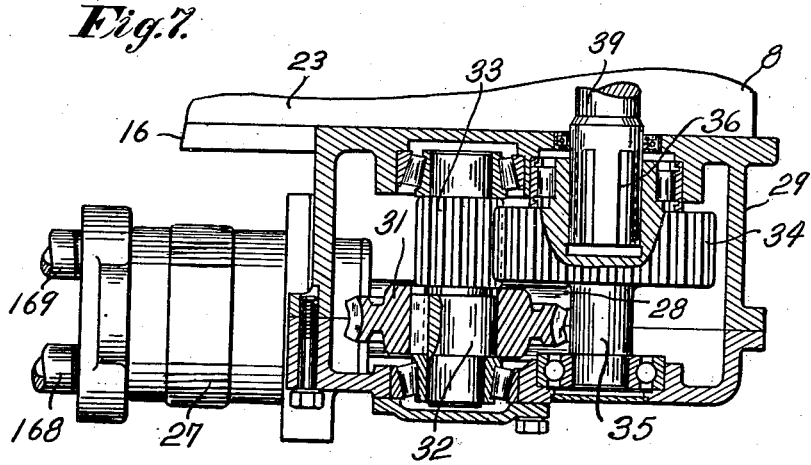
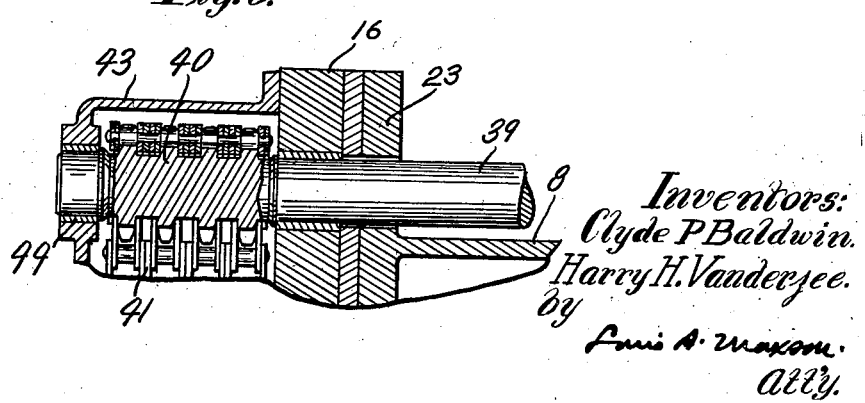

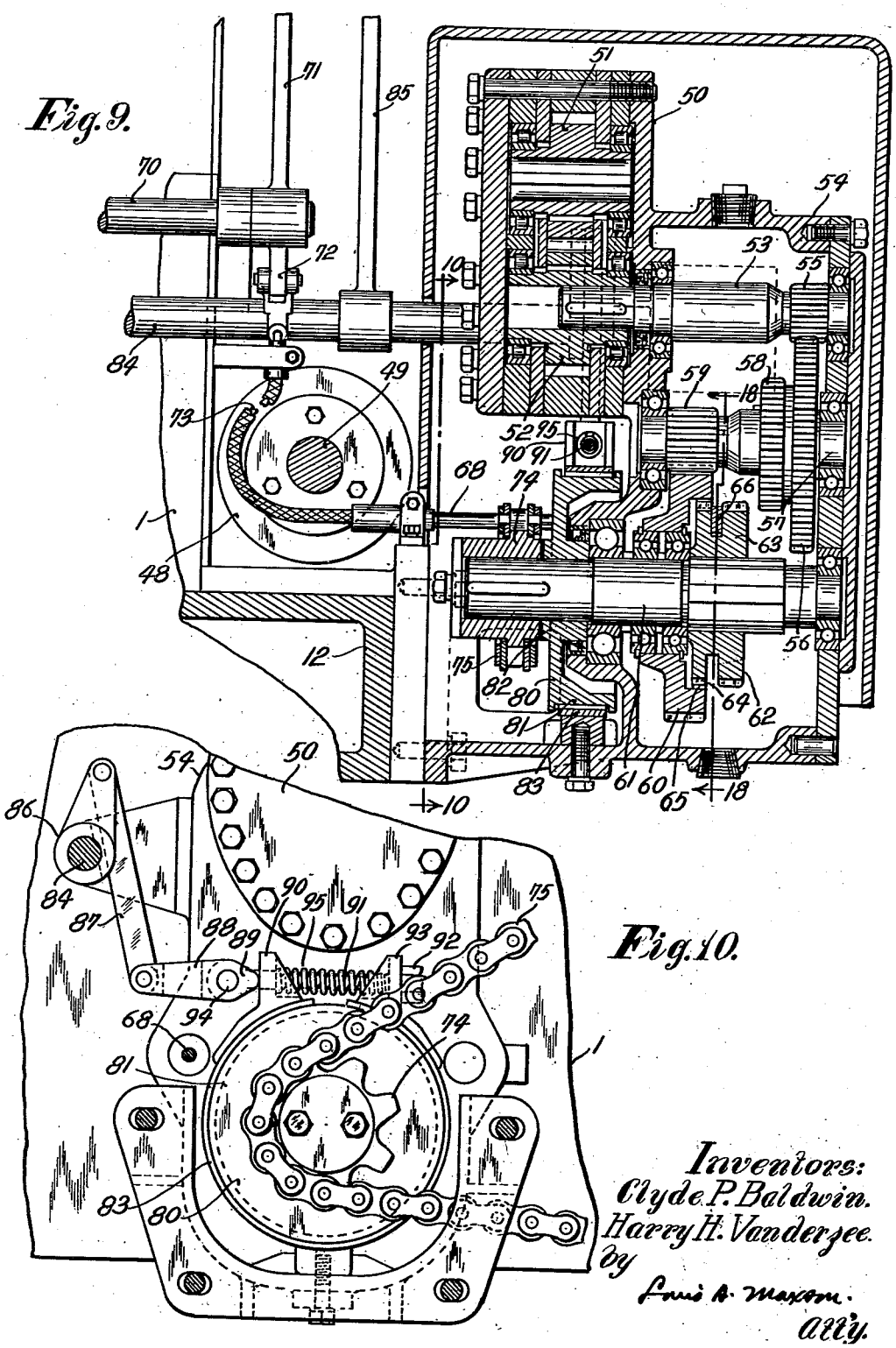

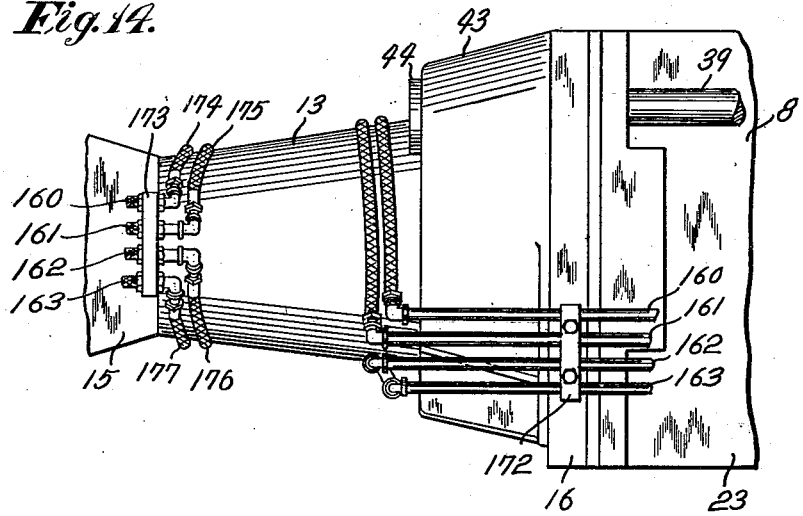
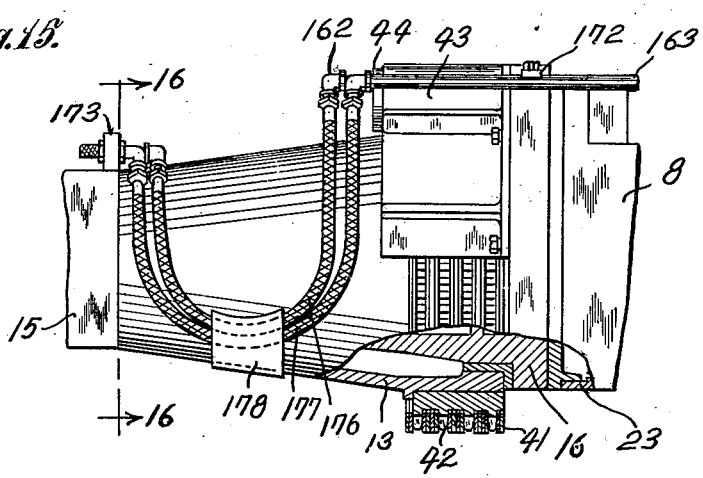
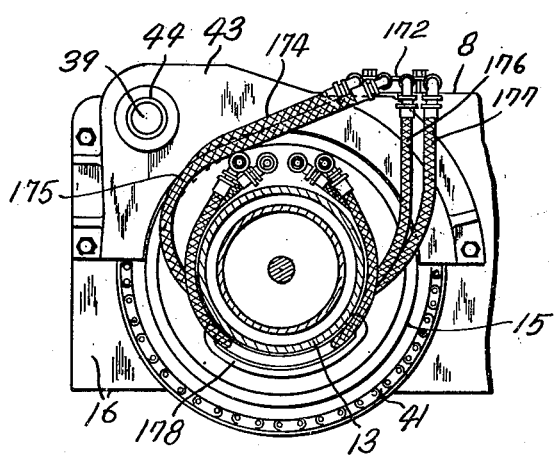

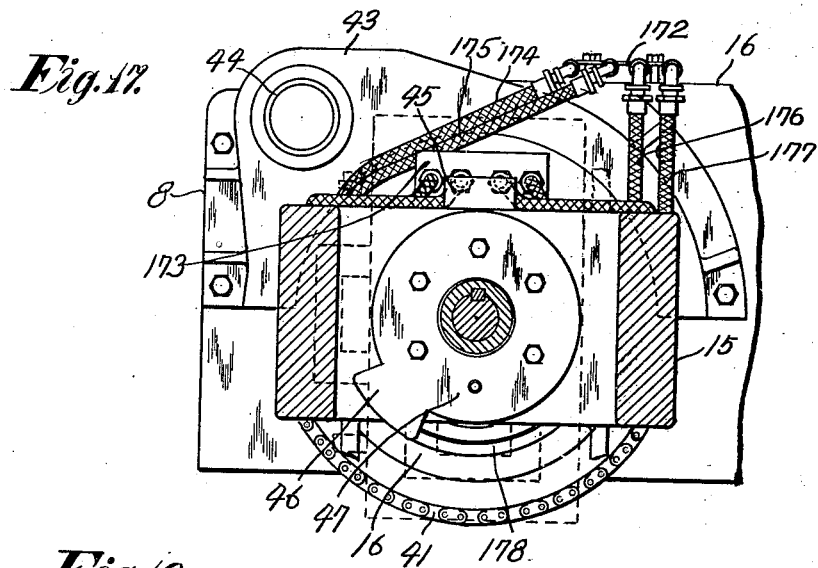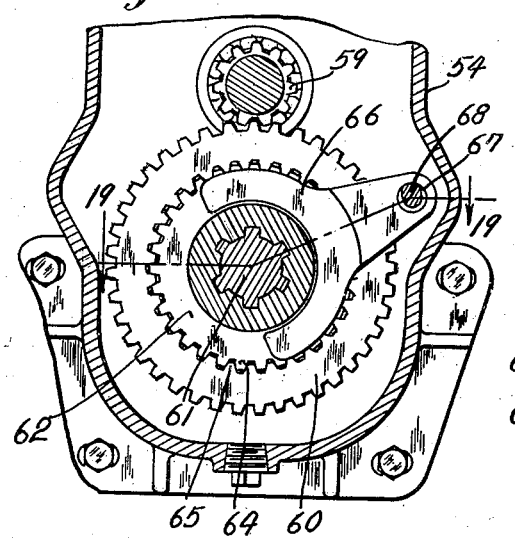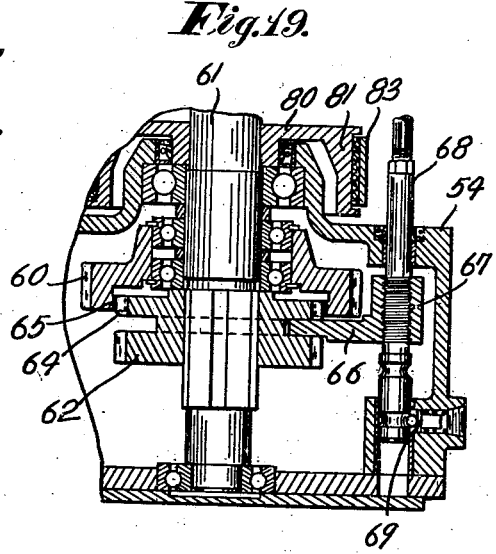

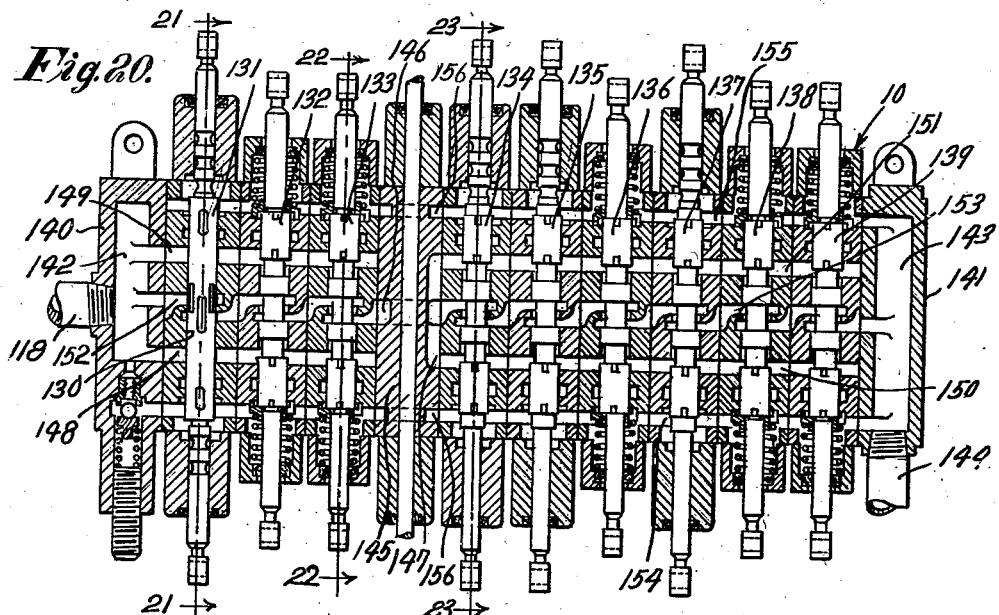
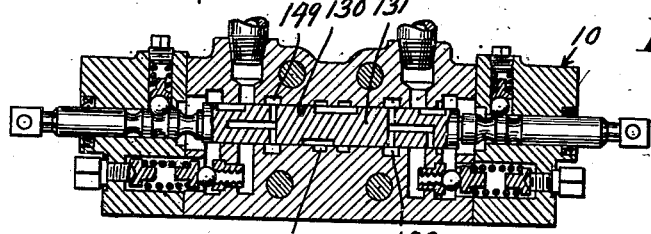
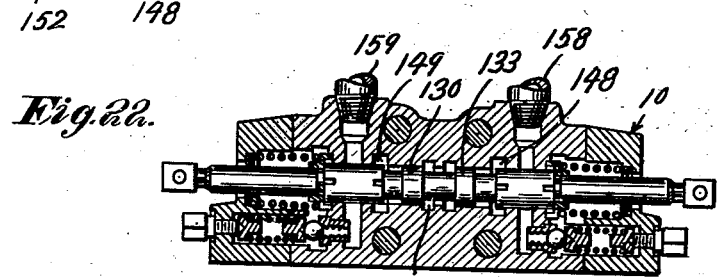
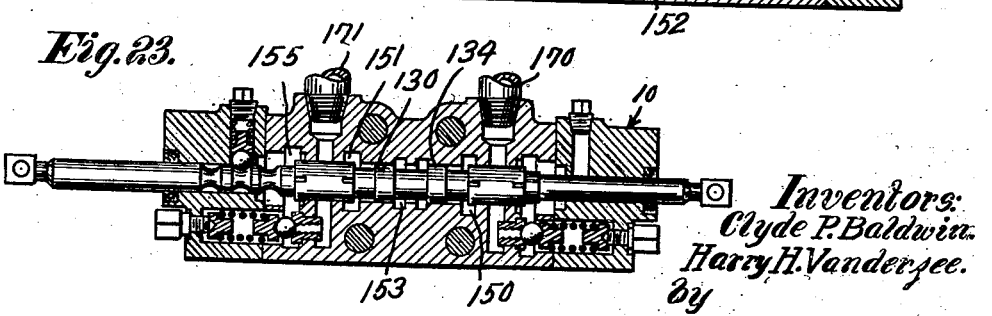

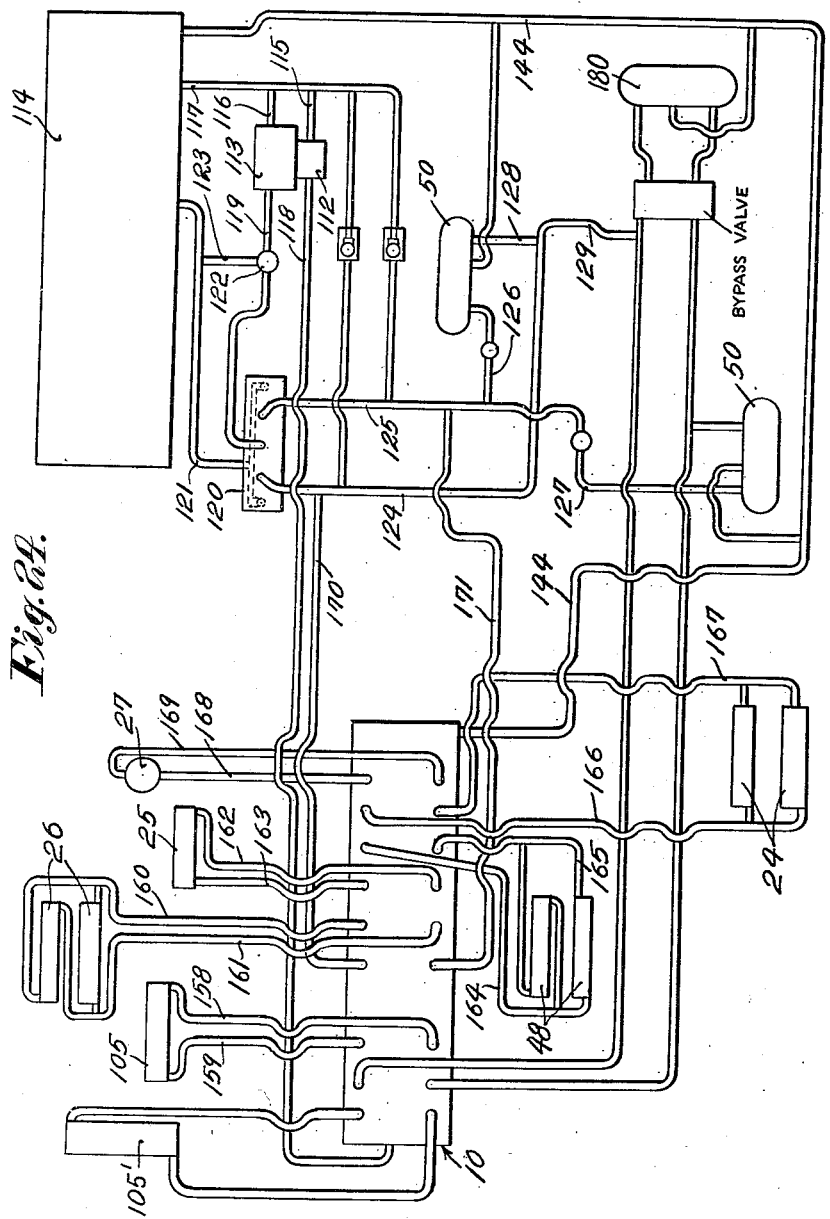

Patented Sept. 11, 1945

2,384,447

UNITED STATES PATENT OFFICE 2,384,447

CONTROL MECHANISM FOR MINING APPARATUS

Clyde P. Baldwin and Harry H. Vanderzee, Claremont, N. H., assignors to Sullivan Machinery Company, a corporation of Massachusetts Application May 21, 1941, Serial No. 394,410

31 Claims. (Cl. 180—66)

This invention relates to mining apparatus, and more particularly to improvements in coal mining apparatus of the rubber-tired type especially designed for use in trackless coal mining and capable of cutting plane kerfs at various locations in a coal seam.

An object of the present invention is to provide an improved coal mining apparatus of the rubber-tired type especially designed for use in trackless coal mines, which may be readily maneuvered and is capable of cutting plane kerfs at various locations in a coal seam. Another object is to provide an improved coal mining apparatus mounted on and propelled and steered by rubber-tired wheels and having improved propelling and steering mechanism. A further object is to provide an improved rubber-tired coal mining apparatus which is of a relatively compact construction and having relatively great flexibility permitting ready maneuverability of the apparatus in the underground passages of a coal mine. Yet another object is to provide an improved coal mining apparatus of the rubber-tired type having an improved power-operated steering mechanism whereby the apparatus may be readily steered through the sharply curved and relatively restricted passages of a coal mine. A still further object is to provide an improved coal mining apparatus having an improved hydraulic system which embodies improved control valve means for controlling the flow of liquid under pressure with respect to certain of the hydraulically operated devices. Still another object is to provide an improved coal mining apparatus having novel combinations and arrangements of parts. Further objects and advantages will become apparent as the description proceeds.

Certain features originally claimed in this application and relating to the improved means thereof for rotating the cutter carrying head and for locking the cutter carrying head in its different positions of adjustment and to the improved fluid supply connections associated with the rotatable cutter carrying head whereby fluid is conducted in an improved manner to the hydraulically operated devices mounted on the cutter carrying head are being claimed in my copending divisional application Serial No. 432,150, filed Feb. 24, 1942.

In the accompanying drawings there is shown for purposes of illustration one form which the invention may assume in practice.

In these drawings:

Figs. 1 and 3, when taken together, constitute a plan view of the improved mining apparatus, with a portion of the top cover broken away to illustrate structural details.

Figs. 2 and 4, when taken together, constitute a side elevational view of the mining apparatus shown in Figs. 1 and 3.

Fig. 5 is an enlarged detail view illustrating a portion of the hydraulically operated steering mechanism.

Fig. 6 is an enlarged detail cross sectional view taken substantially on line 6—6 of Fig. 1.

Fig. 7 is a detail horizontal sectional view taken on line 7—7 of Fig. 6.

Fig. 8 is an enlarged detail vertical sectional view taken substantially on line 8—8 of Fig. 1.

Fig. 9 is an enlarged detail cross sectional view taken substantially on line 9—9 of Fig. 1.

Fig. 10 is a detail vertical sectional view taken on line 10—10 of Fig. 9.

Fig. 14 is an enlarged fragmentary plan view of a portion of the kerf cutting mechanism shown in Fig. 1.

Fig. 15 is a side elevational view of the structure shown in Fig. 14, with a portion broken away in vertical section, illustrating structural details.

Fig. 16 is a cross sectional view taken substantially on line 16—16 of Fig. 15.

Fig. 17 is an enlarged cross sectional view taken substantially on line 17—17 of Fig. 1.

Fig. 18 is a detail cross sectional view taken substantially on line 18—18 of Fig. 9.

Fig. 19 is a detail horizontal sectional view taken on line 19—19 of Fig. 18.

Fig. 20 is a horizontal sectional view through the control valve mechanism.

Fig. 21 is a vertical sectional view taken substantially on line 21—21 of Fig. 20.

Fig. 22 is a vertical sectional view taken substantially on line 22—22 of Fig. 20.

Fig. 23 is a vertical sectional view taken substantially on line 23—23 of Fig. 20.

Fig. 24 is a diagrammatic view illustrating the hydraulic system embodying the control valve mechanism shown in Fig. 20.

Figure 11:
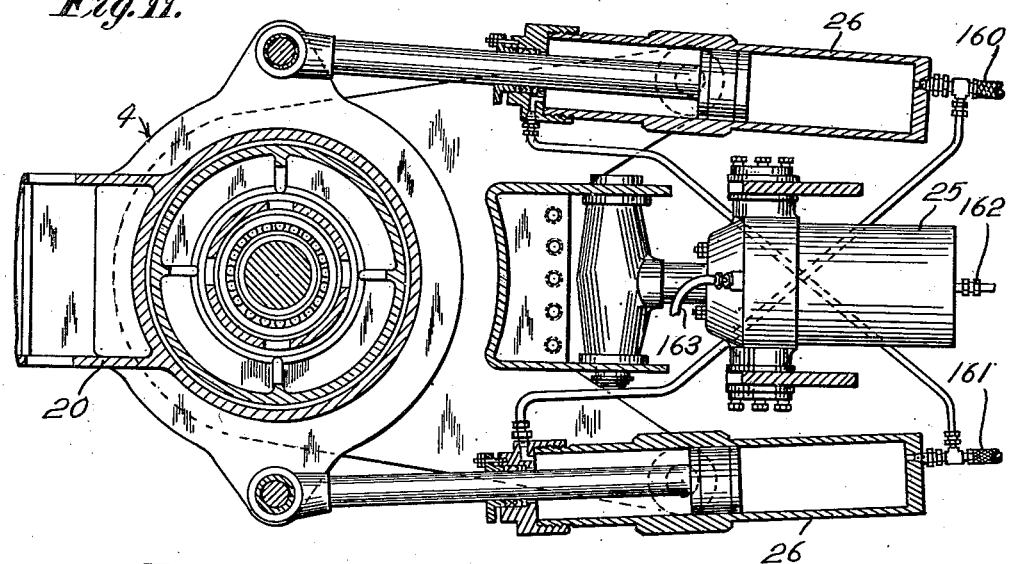
Fig. 11 is an enlarged horizontal sectional view taken substantially on line 11—11 of Fig. 2.
Figure 12:
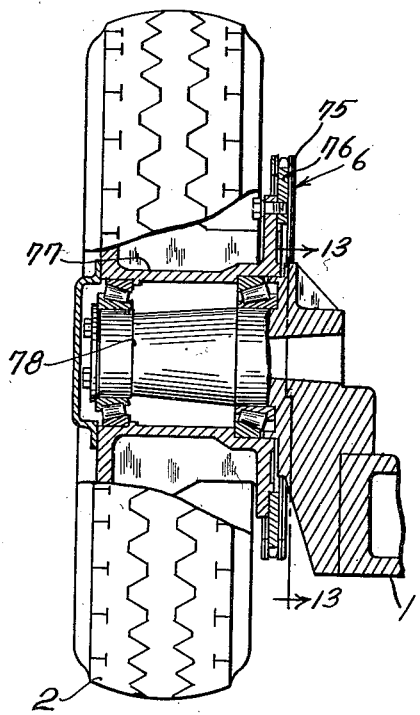
Fig. 12 is an enlarged detail cross sectional view taken substantially on line 12—12 of Fig. 1.
Figure 13:
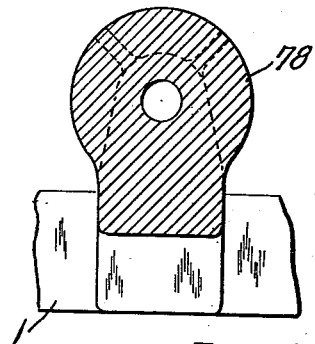
Fig. 13 is a detail vertical sectional view taken on line 13—13 of Fig. 12.

In the illustrative embodiment of the invention there is shown a coal mining apparatus of the rubber-tired type especially designed for use in trackless coal mining. It will be evident, however, that various features of the invention may be embodied in mining apparatus of various other types, and, if desired, the apparatus may be mounted on track wheels to travel along a mine trackway or may be tractor-tread mounted.

The mining apparatus as disclosed is mounted on relatively large pneumatic rubber-tired wheels 5 adapted to run along the floor of a mine without the aid of a guiding trackway, and has kerf cutting mechanism capable of cutting plane kerfs in a coal seam at various locations with comparative ease and efficiency. Since the apparatus is mounted to run on rubber-tired wheels which directly engage the mine floor, the apparatus is not dependent on a guiding trackway, and, therefore, may be maneuvered in any desired direction and located at any desired point with respect to the coal face and ribs; and by the provision of the improved propulsion means the apparatus may be propelled at any desired speed and the rubber-tired traction wheels may be employed to move the apparatus over the mine floor both during maneuvering and the kerf cutting operation.

The mining apparatus herein constitutes an improvement over that disclosed in our copending application Serial No. 378,728, filed February 13, 1941, and generally comprises a main frame or body 1 mounted on front rubber-tired traction wheels 2 and rear rubber-tired steering wheels 3. The main frame or body carries at its forward end adjustable kerf cutting mechanism, generally designated 4, including a kerf cutter 5. The front traction wheels have driving means, generally designated 6, 6, while associated with the rear steering wheels is power-operated steering mechanism, generally designated 7. A motor 8 drives the kerf cutter, while a separate motor 9 drives the pumping means of the hydraulic system, and the latter embodies control valve mechanism, generally designated 10.

The kerf cutting mechanism 4 is generally disclosed in the copending application Serial No. 378,728 above referred to, and generally comprises a horizontal turntable 12 carried at the front end of the main frame or body 1 intermediate the front traction wheels, in the manner shown in Fig. 1, and pivotally mounted on this turntable, to swing in a vertical direction relative thereto, is an elongated arm structure or boom 13. The arm structure or boom overlies the turntable and extends forwardly in advance of the forward end of the main frame or body, and the forward portion of the boom carries a rotatable cutter carrying head 14 which constitutes an outer extension of the boom. The cutter carrying head is mounted to rotate about the longitudinal axis of the boom and has a rotatable front neck frame 15 journaled on bearings on the non-rotatable rear boom frame 16. Pivotally mounted at 17 on the forward portion of the rotatable neck frame 15 is a cutter support 18, the latter being swingable relative to the neck frame about an axis at right angles to the axis of head rotation. The cutter support 18 of the rotatable cutter carrying head 14 has pivotally mounted thereon to swing about the axis 19 a cutter carrying hanger frame 20, the latter being swingable relative to the cutter support about an axis at right angles to the cutter support pivot axis. The kerf cutter 5 is carried by the hanger frame 20 and comprises an elongated plane cutter bar 21 having guided for circulation about its margin an endless cutter chain 22. The motor 8 is arranged at the rear portion of the boom, and the casing 23 of this motor constitutes the rearward portion of the boom frame. This motor is preferably of the electric type and preferably has its armature shaft arranged with its axis of rotation coincident with the axis of rotation of the cutter carrying head and is operatively connected to the cutter chain 22 to drive the latter, in the manner fully described in the copending application Serial No. 378,728 mentioned above, so that the cutter chain may be driven irrespective of the position of the cutter carrying head about its axis, the tilted position of the cutter support, or the swivelled position of the bar hanger frame.

For swinging the boom in a vertical direction about its pivot relative to the turntable and for locking the boom in its adjusted position, there are provided, at the opposite sides of the boom, upright hydraulic cylinders 24, while mounted on the neck frame 15 of the cutter head is a hydraulic cylinder 25 for tilting the cutter support about its pivot relative to the neck frame and for locking the cutter support in its adjusted position. Also mounted on the neck frame, at the opposite sides of the latter, are hydraulic cylinders 26, 26 for swinging the bar hanger frame 20 about its pivotal axis with respect to the cutter support and for holding the bar hanger frame in its adjusted position. These hydraulic cylinders and their operative connections with the devices swung thereby are likewise fully described in the copending application Serial No. 378,728 above referred to, and further mention thereof will be made later.

The means for rotating the cutter carrying head 14 about the longitudinal axis of the boom 13 may assume various forms, and, as herein shown, comprises a conventional hydraulic motor 27 mounted on the motor casing 23 at the rear end of the boom. This motor 27 is of the reversible type and has its power shaft keyed to a worm shaft 28 (Fig. 6), herein suitably journaled within a housing 29 secured to the rear end of the boom. The worm 30 of the worm shaft meshes with a worm wheel 31 (see also Fig. 7) keyed to a longitudinal shaft 32 likewise suitably journaled within the gear housing 29. Secured to and driven by the shaft 32 is a spur gear 33 meshing with a spur gear 34, the latter having its hub integral with a longitudinal shaft 35. The shaft 35 is suitably journaled in the housing 29 and is keyed at 36 to an alined shaft 39. The shaft 39 extends longitudinally over the top of the motor casing 23, as shown in Fig. 1, and is suitably journaled in bearings supported by the boom. Fixed to the forward end of the shaft 39, as shown most clearly in Fig. 8, is a chain sprocket 40 connected by an endless drive chain 41 to a large chain sprocket 42 (Fig. 15), the latter herein keyed to the rearward portion of the rotatable neck frame 15 of the cutter carrying head and surrounding the axis of head rotation. The upper portion of the drive chain 41 is guarded by a housing 43, and the forward end of the shaft 39 is journaled in an outboard bearing 44 supported by this housing (Fig. 8). The teeth of the worm gears 30, 31 are self-locking and serve to lock automatically the cutter head in its different positions of adjustment. As shown in Fig. 17, rotation of the cutter carrying head with respect to the boom is limited by a stop lug 45 secured to the neck frame and engageable with a stop lug 46 formed on an end plate 47 secured to the nonrotatable rearward portion 16 of the boom. Mounted on the main frame or body 1 at the opposite sides of the turntable 12 are hydraulic cylinders 48, 48 (Fig. 1) containing reciprocable pistons having their piston rods 49 pivotally connected to lateral lugs integral with the turntable for rotating the turntable, thereby to swing the boom structure in a horizontal direction, in a manner likewise described in the copending application Ser. No. 378,728 above referred to. When the liquid is trapped within these hydraulic cylinders, the turntable may be locked in its different positions of adjustment.

Now referring to the traction wheel driving means 6, 6, it will be noted that in the embodiment of the invention illustrated, mounted on transverse axes at the opposite sides of the main frame or body 1, just rearward of the front traction wheels, are hydraulic motors 50, 50. These motors are of the reversible type and each comprises intermeshing motor rotors 51, 52 (Fig. 9) suitably journaled within the motor casing. Since these motors and the transmission means between the rotors and the traction means are identical in design, a description of the drive for one traction wheel will suffice for both. As shown, the motor rotor 52 is keyed to a transverse transmission shaft 53 suitably journaled within bearings supported within a gear housing 54 secured to the main frame or body 1. Secured to the shaft 53 and driven thereby is a spur gear 55 meshing with a spur gear 56 secured to a horizontal shaft 57. The shaft 57 is disposed in parallelism with the shaft 53 below the latter and is likewise suitably journaled within the housing. Secured to the shaft 57 are high and low speed gears 58, 59, the latter meshing with a large spur gear 60 journaled on a horizontal shaft 61. The shaft 61 is arranged in parallelism with the shaft 57 beneath the latter and is likewise journaled in the gear housing. Splined to the shaft 61 is a sliding clutch member 62 having an integral spur gear 63 adapted to mesh with the high speed gear 58. The clutch member 62 has clutch teeth 64 adapted to interlock with integral clutch teeth 65 formed on the spur gear 60. When the clutch teeth 64 are released from the gear 60 and the gear 63 is in meshing engagement with the high speed gear 58, the shaft 61 may be driven at a relatively high speed, and when the gear 63 is out of meshing engagement with the gear 58 and the clutch teeth 64, 65 are in interlocking relation, the shaft 61 may be driven through the low speed gear 59 and gear 60 at a relatively low speed. The operating means for the sliding clutch member 62 comprises, as shown in Figs. 18 and 19, a shifter yoke 66 engaged in an annular groove on the clutch member and secured at 67 to an operating rod 68. This operating rod is slidably guided in bearings supported within the gear housing 54, and a spring-pressed detent lock 69 is provided for holding the rod in its different positions of adjustment. Mounted on the top of the main frame, rearwardly of the boom, is a transverse operating rod 70 (Fig. 1) provided at its opposite ends with operating handles 71 conveniently located at the opposite sides of the apparatus. As shown in Fig. 9, projecting from the hubs of the operating handles 71 are levers 72 connected through flexible operating cables 73 to the clutch operating rods 68. It will thus be seen that the speed controlling clutches for the plural speed transmissions for the front traction wheels may be concurrently operated through the connections above described, from either side of the apparatus. Secured to and driven by the shafts 61 are chain sprockets 74 connected by endless drive chains 75 to sprockets 76 secured to the hubs 77 of the front traction wheels. The front traction wheels are journaled in bearings supported by stub shafts 78 fixed to the opposite sides of the main frame of the apparatus. From the foregoing it will be evident that the front traction wheels may be driven by the hydraulic motors 50 through the connections above described at either a relatively high maneuvering speed or a relatively low speed appropriate for cutting.

Associated with each of the driving means for the front traction wheels is a brake 80 (Figs. 9 and 10) each comprising a brake drum 81 clutched at 82 to one of the chain sprockets 74 and having a cooperating contractible brake band 83. The brake bands may be concurrently applied or released through operating means comprising an operating rod 84 (Fig. 1) extending across the top of the apparatus in parallelism with the clutch operating rod 70 and having operating handles 85 arranged in adjacency to the clutch operating handles 71. Secured to the operating rod 84 are cranks 86 connected through links 87 to cam levers 88. These levers are provided with cam portions 89 engageable with ears 90 secured to one end of each brake band. Bolts 91 have heads 92 engaging the ears 93 secured to the other end of each brake band, and these bolts are pivotally connected at 94 to the cam levers 88. Encircling the bolts 91 and arranged between the ears 90, 93 are coil springs 95 which urge the brake bands toward their released position. When the cam levers 88 are swung about their pivotal connections with the bolts, the brake band ears are drawn together to effect application of the brakes. It is accordingly evident that the traction wheel brakes may be operated from either side of the apparatus and may be concurrently applied or released.

The mounting for the rear steering wheels 3 is similar to that fully described in our copending application Ser. No. 378,728 above referred to and comprises a transverse rear axle 100 pivotally connected at 101 to the bottom of the main frame 1, and the axis of pivotal connection lies in the central longitudinal vertical plane of the apparatus. Swivelled axles 102 are pivotally mounted on vertical pivot pins 103 carried at the opposite ends of the transverse axle. Various means may be employed for swinging the axles 102 to effect steering, but, as shown herein, comprises steering gear linkage, generally designated 104. For effecting movement of the steering wheels through the linkage 104, a hydraulic cylinder 105 (Fig. 5) is pivotally mounted at 106 on the transverse axle 100. This cylinder contains a reciprocable piston 107 having its piston rod 108 pivotally connected to an actuating lever 109 of the linkage 104. It is accordingly evident that when liquid under pressure is supplied to one end or the other of the cylinder 105 the steering wheels may be turned in one direction or the other about their pivotal mountings at the opposite ends of the transverse axle 100, through the linkage 104. Liquid under pressure may be supplied to the cylinder 105 in a manner to be later explained. The angle of the axle 100 to the main frame of the machine may be controlled by a hydraulic cylinder device 105′ as more fully explained in our earlier filed application Ser. No. 378,728 above mentioned.

Now referring to the hydraulic system, it will be observed that the motor 9 has its power shaft connected by a flexible coupling 110 to the drive shaft of a pumping means 111. The pumping means may comprise two distinct pumping units, but in this instance comprises a dual pumping means having a pump section 112 of low capacity discharge and a pump section 113 of high capacity discharge. The control valve mechanism 10 is mounted in a horizontal position on the top of the main frame 1, as shown in Fig. 3, and beneath the valve mechanism is a liquid tank 114. As shown diagrammatically in Fig. 24, the pumps 112, 113 have their intakes respectively connected by conduits 115, 116 to a liquid supply conduit 117 leading to the tank 114, while the pump discharges are respectively connected to conduits 118 and 119. The discharge conduit 119 of the large capacity pump 113 leads to a conventional manually controllable four-way valve device 120 which has its valve-receiving bore connected by a conduit 121 to the tank 114. The discharge conduit 119 has a relief valve 122 connected by a conduit 123 leading to the tank, and this relief valve is set to open automatically in the event the pressure in the system reaches a predetermined maximum, thereby to prevent overload. Also leading from the valve-receiving bore of the four-way valve device are conduits 124 and 125, the latter being connected through branch conduits 126 and 127 to the traction wheel driving motors 50. The conduit 124 is likewise connected through branch conduits 128 and 129 to the traction wheel driving motors 50, the conduit 129 being connected to its motor through a by-pass valve, in the manner fully described in the copending application Ser. No. 378,728 above referred to.

The control valve mechanism 10 comprises a horizontal valve box assembly (Figs. 20, 21, 22 and 23) consisting of a number of valve box sections rigidly secured together by tie bolts, and this valve box structure is likewise fully described in the copending application Ser. No. 378,728 mentioned above. The valve box sections have valve-receiving bores 130 containing slide valves 131, 132, 133, 134, 135, 136, 137, 138 and 139, and these valves control the flow of liquid under pressure from the discharge of the small capacity pump 112 to the various hydraulic motors. Secured to the end valve box sections are intake and discharge sections 140 and 141. The small capacity pump has its discharge conduit 118 connected to a supply passage 142 in the intake section 140, and a discharge passage 143 in the discharge section 141 is connected by a return conduit 144 back to the tank 114. Interposed between the valve box sections containing the valves 133 and 134 is a member 145 having an annularly extending groove 146 communicating with a longitudinal groove 147. Parallel longitudinal passages 148 and 149 extend through the valve box sections containing the valves 131, 132 and 133, and the inner ends of these passages are closed by the member 145, in the manner shown in Fig. 20. Similar parallel longitudinal passages 150 and 151 extend through the valve box sections containing the valves 134, 135, 136, 137, 138 and 139 and are blocked off from the discharge passage 143 by the wall of the discharge section 141. Also extending longitudinally through the valve box sections containing the valves 131, 132 and 133 is a center by-pass passage 152 connected by the groove 146 in the member 145 to a center by-pass passage 153 in the other valve-containing valve box sections. The longitudinal groove 147 in the member 145 connects the center by-pass passage 152 with the parallel passages 150 and 151. Parallel discharge passages 154 and 155 extend longitudinally through the valve box sections and communicate with the ends of the valve-receiving bores and with the discharge passage 144. The member 145 is annularly grooved at 156, and the passages 154 and 155 communicate with these grooves in the manner shown. Since the structures of these valves and the hydraulically operated devices controlled thereby are fully described in the copending application Ser. No. 378,728 above referred to, and since the particular structures of these valves and devices do not per se enter into this invention, further details thereof are herein unnecessary.

The valve 133 controls the flow of liquid under pressure with respect to the hydraulic steering cylinder 105 of the steering mechanism. When the valve 133 is in the position shown in Fig. 20, liquid under pressure may flow from the supply passage 142 through the center by-pass passage 152, grooves 146, 147 in the member 145 and supply passages 150 and 151, so that any of the valves 134, 135, 136, 137, 138 and 139 may be operated to control the flow of liquid under pressure with respect to the hydraulically operated devices controlled thereby. However, when the valve 133 is in a position to supply liquid under pressure to one end or the other of the hydraulic cylinder 105, flow of liquid under pressure from the center by-pass passage 152 to the supply passages 150 and 151 is cut off by the valve 133. Conversely when the valve 133 is in a position to supply fluid to the propelling motors the fluid supply to the steering cylinder 105 is cut off. By the provision of this construction, the possibility of a loss of pressure in the steering cylinder 105 during propelling of the apparatus about the mine is substantially eliminated. The valves 131 and 132 are placed on the same side of the member 145 as the valve 133, but this is done merely for convenience, and, if desired, the valves 131, 132 could be placed at the other side of the member 145. As above mentioned, the valve 133 controls the steering mechanism for the steering wheels, and the bore containing the valve 133 is connected by conduits 158, 159 to the opposite ends of the steering cylinder 105. The bore containing the valve 135 is connected by conduits 160 and 161 respectively connected to the opposite ends of the bar swinging cylinders 26. The bore containing the valve 136 is connected by conduits 162 and 163 to the opposite ends of the cutter support tilt cylinder 25, and the conduits 160, 161, 162, and 163 are arranged in a novel manner with respect to the rotatable neck frame 15 of the cutter carrying head 14, as will later be described. The bore containing the valve 137 is connected by conduits 164 and 165 respectively connected to the opposite ends of the boom swing cylinders 48. The bore containing the valve 138 is connected by conduits 166 and 167 to the opposite ends of the boom lift cylinders 24, while the bore containing the valve 139 is connected by conduits 168 and 169 to the head rotating motor 27. The bore containing the valve 134 is connected by conduits 170 and 171 to the conduits 124 and 125, respectively. As shown in Figs. 14, 15 and 16, the conduits 160, 161, 162 and 163 are secured by a clamp plate 172 to the top of the boom, these conduits extending over the top of the boom and having their forward portions secured by a clamp plate 173 to the rotatable neck frame 15. Intermediate the conduit portions on the top of the boom and the conduit portions on the rotatable neck frame are flexible portions 174, 175, 176 and 177, and these flexible portions partially encircle the neck frame at the opposite sides of the latter, in the manner shown in Fig. 16. These flexible conduit portions permit rotation of the cutter head with respect to the boom within the limits provided by the stop lugs 45, 46 (see Fig. 17). A guide bracket 178, secured to the boom frame 15, serves as a guide for the central loop portions of the flexible conduit portions 174, 175, 176 and 177. It is accordingly evident that by the provision of the particular arrangement of the supply connections with respect to the neck frame of the cutter carrying head, liquid under pressure may be supplied to the cutter support tilt cylinder 25 and the cutter bar swing cylinders 26, 26 irrespective of the position of the cutter carrying head about the longitudinal axis of the boom.

The valve device 131 controls the stabilizer cylinder device 105' and the valve 132 the drive of an electric cable reel 179 by a hydraulic reel driving motor 180 by fluid from the pump 112.

The mode of operation of the improved mining apparatus is essentially the same as that fully described in our copending application Ser. No. 378,728 mentioned above. As in the above mentioned copending application, the apparatus may be propelled about the mine at a relatively high traveling speed by the motors 50 driving the front traction wheels 2, and, at that time, the discharge of liquid under pressure from both pumps 112, 113 may be delivered to the motors. During the relatively slow movement of the apparatus about the mine, liquid under pressure is supplied from the low capacity pump to the propelling motors, and the discharge from the large capacity pump may either supplant or supplement the low capacity pump discharge to obtain the desired wheel driving speed. During the kerf cutting operation, that is, when it is desired to insert plane kerfs at various locations in a coal seam, liquid under pressure may be supplied to the hydraulic cylinders 24, 25, 26 and 48 and the head rotating motor 27 under the control of the slide valves 136, 136, 135, 137 and 139, respectively, to effect adjustment of the kerf cutter into the desired cutting position and to effect movement of the kerf cutter during the kerf cutting operation. The turntable rotating cylinders 48 may be operated to swing the cutter supporting boom laterally, and the cutter swinging cylinders 26 may be operated to swing the cutter about its pivot relative to the boom. The cylinders 24 may be operated to swing the boom in a vertical direction relative to the turntable while the cylinder 25 may be operated to tilt the cutter support relative to the neck frame. The head rotating motor 27 may be operated to turn the cutter carrying head about the longitudinal axis of the boom to locate the kerf cutter in either vertical, horizontal or any desired intermediate cutting positions. When liquid is trapped in the various hydraulic cylinders, the parts adjusted thereby may be locked in their adjusted position. During propulsion of the apparatus about the mine, the front traction wheels are driven at a relatively high speed by the propelling motors 50 under the control of the four-way valve device 120, and the traction wheels may be driven at a relatively low speed under the control of the slide valve 134. Steering is effected by the hydraulic cylinder 105 under the control of the slide valve 133, and during liquid flow to the cylinder 105 the supply of liquid under pressure to the valves 134, 135, 136, 137, 138 and 139 may be cut off, so that full line pressure may be supplied to the steering cylinder. Propulsion under control of the four-way valve 120 by means of fluid from the pump 113 will not, however, be affected. Evidently, the adjustment of the valve 133 may be such as wholly, or only partially, to cut off fluid delivery through the passage 146. The cutter carrying head may be rotated relative to the rearward portion of the boom by the motor 27 under the control of the slide valve 139, and head rotation is effected through the gearing 30, 31, 33, 34, shaft 35 and the chain and sprockets 40, 41, 42, and when the supply of liquid to the head rotating motor is cut off the self-locking teeth of the worm gears 30, 31 hold the cutter head in its position of adjustment. At times the discharges from both pumps may be conducted to the traction wheel driving motors and the traction wheels may be driven at three different speeds by controlling the flow of liquid from the pumps to the motors, and these speeds may be changed by the high and low speed transmissions. Thereby the apparatus may be propelled through a wide range of cutting speeds and through a wide range of maneuvering and traveling speeds. The brakes 80 for the front traction wheels may be employed to brake the apparatus when the supply of liquid to the propelling motors is cut off, and these brakes may be utilized to hold the apparatus stationary during certain of the kerf cutting operations. Since the general mode of operation of a mining apparatus of the character disclosed is fully described in our copending application Ser. No. 378,728 above mentioned, further description of the mode of operation of the apparatus is unnecessary.

As a result of this invention it will be noted that an improved rubber-tired coal mining apparatus is provided especially designed for use in trackless coal mines. It will further be evident that by mounting the mining apparatus on pneumatic rubber-tired wheels the apparatus may readily move over the mine floor without the aid of a guiding trackway. Also, it will be noted that an improved mining apparatus is provided capable of cutting plane kerfs in a coal seam at various locations with efficiency and economy, it being possible to adjust the kerf cutter to cut horizontal kerfs at either the floor or roof levels or any desired intermediate level or to cut shearing kerfs perpendicular or inclined to the horizontal kerfs and also to cut horizontal and vertical kerfs in either rib. Further, by the provision of the improved hydraulic operating and controlling means for the hydraulically operated devices of the apparatus, extreme flexibility in operation is obtained. These and other uses and advantages of the improved mining apparatus will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a mining apparatus, the combination comprising fluid operated propelling means, fluid operated steering means, a source of fluid under pressure, and mechanism for controlling the flow of fluid under pressure from said source to both of said fluid operated means, said mechanism including valve means for controlling the flow of fluid to said steering means, and valve means for controlling the flow of fluid to said propelling means, said mechanism being operative to interrupt fluid flow to said valve means which controls said propelling means when said other valve means is in a position to supply fluid to said steering means.

2. In a mining apparatus, the combination comprising fluid operated propelling means, fluid operated steering means, a source of fluid under pressure, and mechanism for controlling the flow of such fluid under pressure to both of said fluid operated means, said mechanism including valves for respectively controlling the flow of fluid to said fluid operated means, fluid flow to said propelling means occurring past both valves, and said valve controlling said steering means being positionable to cut off fluid flow to said other valve.

3. In a mining apparatus, in combination, fluid operated propelling means, fluid operated steering means, a plurality of sources of operating fluid, means for controlling the supply of operating fluid from one of said sources to said propelling means, and means for supplying and controlling the supply of operating fluid from another of said sources to said propelling means and to said steering means, said fluid supplying and controlling means including conduit means through which operating fluid from said second mentioned source must pass to reach said propelling means and further including valve means so constructed and arranged that when said conduit means is in communication with said second mentioned source said steering means is cut off from communication with said second mentioned source.

4. In a mining apparatus, in combination, fluid operated propelling means, fluid operated steering means, a plurality of sources of operating fluid, means for controlling the supply of operating fluid from one of said sources to said propelling means, and means for controlling the supply of operating fluid from another of said sources to said propelling means and to said steering means including means so operative that when flow of fluid is established from said second source to said steering means the supply of any fluid from such source to said propelling means is interrupted.

5. In a mining apparatus, in combination, fluid operated propelling means, fluid operated steering means, a plurality of sources of operating fluid, means for controlling the supply of operating fluid from one of said sources to said propelling means, and means for controlling the supply of operating fluid from another of said sources to said propelling means and to said steering means including separate valve devices for said steering and propelling means respectively, the valve device for said steering means movable on effecting fluid supply to the latter to cut off the fluid supply to the valve device for controlling said propelling means.

6. In an apparatus of the character described, the combination comprising power operated propelling means for the apparatus, power operated means for steering the apparatus, a source of motive power, and means for controlling the supply of motive power to said propelling means and said steering means, said controlling means including control devices respectively controlling the supply of power to said propelling and steering means, and means for interrupting the delivery of motive power to said control device for controlling said propelling means when said other control device is in a position to supply motive power to said steering means.

7. In an apparatus of the character described, the combination comprising power operated propelling means for the apparatus, power operated steering means for the apparatus, a source of motive power, and means for controlling the supply of motive power to both said propelling means and said steering means, said controlling means including control devices for respectively controlling the supply of motive power to said propelling and steering means, motive power being supplied to said propelling means past both control devices, and said control device which controls the supply of power to said steering means being positionable to cut off the supply of power to said other control device.

8. In an apparatus of the character described, in combination, power operated propelling means, power operated steering means, a plurality of sources of motive power, means for controlling the supply of motive power from one of said sources to said propelling means, and means for controlling the supply of motive power from another of said sources to said propelling means and said steering means, said last mentioned controlling means including therein means so related thereto that when motive power is passing from said last mentioned power source to said propelling means to effect propulsion said steering means is cut off from said source.

9. In an apparatus of the character described, in combination, power operated propelling means, power operated steering means, a plurality of sources of motive power, means for controlling the supply of motive power from one of said sources to said propelling means, and means for controlling the supply of motive power from another of said sources to said propelling means and to said steering means including means so constructed and arranged that when flow of motive power is established from said second source to said steering means the supply of motive power from such source to said propelling means is interrupted.

10. In an apparatus of the character described, in combination, power operated propelling means, power operated steering means, a plurality of sources of motive power, means for controlling the supply of motive power from one of said sources to said propelling means, and means for controlling the supply of motive power from another of said sources to said propelling means and said steering means including separate control devices for said steering and propelling means respectively, the control device for said steering means movable on effecting motive power supply to the latter to cut off the motive power supply to the control device for controlling said propelling means.

11. In a mining apparatus, in combination, fluid operated propelling means, fluid operated steering means, a plurality of sources of operating fluid respectively of relatively large and relatively small capacity, means for controlling the supply of operating fluid from one of said sources to said propelling means, and means for controlling the supply of operating fluid from the other of said sources to both said propelling means and said steering means, said last mentioned controlling means including as a part thereof valve means so related to the other parts thereof that when fluid is passing from said last mentioned source to said propelling means to effect propulsion said steering means is cut off from said source.

12. In a mining apparatus, in combination, fluid operated propelling means, fluid operated steering means, a plurality of sources of operating fluid respectively of relatively large and relatively small capacity, means for controlling the supply of operating fluid from said source of large capacity to said propelling means, and means for controlling the supply of operating fluid from said source of small capacity to both said propelling means and said steering means, said last mentioned controlling means including as a part thereof means so related to the other parts thereof that when fluid is passing from said small capacity source to said propelling means to effect propulsion said steering means is cut off from said source.

13. In a mining apparatus, in combination, fluid operated propelling means, fluid operated steering means, a plurality of sources of operating fluid respectively of relatively large and relatively small capacity, means for controlling the supply of operating fluid from one of said sources to said propelling means, and means for controlling the supply of operating fluid from the other of said sources to both said propelling means and said steering means including means whereby when flow of fluid is established from said last mentioned source to said steering means the supply of fluid from such source to said propelling means is interrupted.

14. In a mining apparatus, in combination, fluid operated propelling means, fluid operated steering means, a plurality of sources of operating fluid respectively of relatively large and relatively small capacity, means for controlling the supply of operating fluid from said source of large capacity to said propelling means, and means for controlling the supply of operating fluid from said source of small capacity to both said propelling means and said steering means including means whereby when the flow of fluid from said small capacity source to said steering means is established the supply of any fluid from such source to said propelling means is interrupted.

15. In a mining apparatus, in combination, fluid operated propelling means, fluid operated steering means, a plurality of sources of operating fluid respectively of relatively large and relatively small capacity, means for controlling the supply of operating fluid from one of said sources to said propelling means, and means for controlling the supply of operating fluid from the other of said sources to both said propelling means and said steering means including separate valve devices for said steering and propelling means respectively, the valve device for said steering means movable on effecting fluid supply to the latter to cut off the fluid supply to the valve device for controlling said propelling means.

16. In a mining apparatus, in combination, fluid operated propelling means, fluid operated steering means, a plurality of sources of operating fluid respectively of relatively large and relatively small capacity, means for controlling the supply of operating fluid from said source of large capacity to said propelling means, and means for controlling the supply of operating fluid from said source of small capacity to both said propelling means and said steering means including separate valve devices for said steering and propelling means respectively, the valve device for said steering means movable on effecting fluid supply to the latter to cut off the fluid supply to the valve device for controlling said propelling means.

17. In a mining apparatus, in combination, fluid operated propelling means, fluid operated steering means, a plurality of sources of operating fluid respectively of relatively large and relatively small capacity, means for controlling the supply of operating fluid from said source of large capacity to said propelling means, and means for controlling the supply of operating fluid from said source of small capacity to both said propelling means and said steering means including means operative when flow of fluid takes place from said small capacity source to said steering means to interrupt supply of fluid from said small capacity source to said propelling means, the flow of fluid from said large capacity source to said propelling means being uninterrupted by the precluding of the supply from said small capacity source to said propelling means.

18. In an apparatus of the character described, the combination comprising power operated propelling means for the apparatus, power operated means for steering the apparatus, a plurality of sources of motive power respectively of relatively large and relatively small capacity, means for controlling the supply of motive power from said source of large capacity to said propelling means, and means for controlling the supply of motive power from said source of small capacity to both said propelling means and said steering means, said last mentioned controlling means including therein devices so related to the remaining portions thereof that when motive power is passing from said small capacity power source to said propelling means said steering means is cut off from said source.

19. In an apparatus of the character described, in combination, power operated propelling means, power operated steering means, a plurality of sources of motive power respectively of relatively large and relatively small capacity, means for controlling the supply of motive power from said source of large capacity to said propelling means, and means for controlling the supply of motive power from said source of small capacity to both said propelling means and said steering means including means so constructed and arranged that when flow of motive power from said small capacity source to said steering means is established the supply of motive power from said small capacity source to said propelling means is interrupted.

20. In an apparatus of the character described, in combination, power operated propelling means, power operated steering means, a plurality of sources of motive power respectively of relatively large and relatively small capacity, means for controlling the supply of motive power from said source of large capacity to said propelling means, and means for controlling the supply of motive power from said source of small capacity to both said propelling means and said steering means including means so constructed and arranged that when flow of motive power from said small capacity source to said steering means is established the supply of any motive power from said small capacity source to said propelling means is interrupted, the supply of motive power from said large capacity source to said propelling means remaining uninterrupted, when the supply of motive power from said small capacity source thereto is precluded, by such precluding.

21. In an apparatus of the character described, in combination, power operated means having one function, power operated means having a different function, a plurality of sources of motive power, means for controlling the supply of motive power from one of said sources to said first mentioned power operated means, and means for controlling the supply of motive power from another of said sources to both of said power operated means, said last mentioned controlling means including means so related to the remainder of said last mentioned controlling means that when motive power is passing from said last mentioned power source to said first mentioned power operated means said second mentioned power operated means is cut off from said source.

22. In an apparatus of the character described, in combination, power operated means having one function, power operated means having a different function, a plurality of sources of motive power respectively of relatively large and relatively small capacity, means for controlling the supply of motive power from one of said sources to one of said power operated means, and means for conducting and controlling the supply of motive power from the other of said sources to both of said power operated means including conducting means via which motive power from said other of said sources must pass to reach said one of said power operated means and further including controlling means so constructed and arranged that when said conducting means is connected with said other source the other of said power operated means is cut off from connection with said other source.

23. In an apparatus of the character described, in combination, power operated means having one function, power operated means having a different function, a plurality of sources of motive power, means for controlling the supply of motive power from one of said sources to said first mentioned power operated means, and means for controlling the supply of motive power from another of said sources to both of said power operated means including means so constructed and arranged that when flow of motive power is established from said second source to said second mentioned power operated means the supply of motive power from such source to said first mentioned power operated means is interrupted.

24. In an apparatus of the character described, in combination, power operated means having one function, power operated means having a different function, a plurality of sources of motive power respectively of relatively large and relatively small capacity, means for controlling the supply of motive power from said source of large capacity to said first mentioned power operated means, and means for controlling the supply of motive power from said source of small capacity to both of said power operated means including means operative in such manner that when flow of motive power is established from said small capacity source to said second mentioned power operated means the supply of motive power from said small capacity source to said first mentioned power operated means is interrupted.

25. In a mining apparatus having a portable base adapted to travel over the floor of a mine, the provision of power operated propelling means, power operated steering means, and mechanism for controlling the supply of motive power from a source of motive power to both of said power operated means, said mechanism including a control device for controlling the supply of power to said steering means, a control device for controlling the supply of power to said propelling means and means whereby the operation of said steering control device for supplying power to said steering means will interrupt the supply of motive power to said propelling means.

26. In a mining apparatus as specified in claim 25 the feature that the motive power is supplied to said propelling means past both of said control devices.

27. In a mining apparatus as specified in claim 25, the feature that said controlling mechanism comprises parts so related to each other and to said propelling and steering means that when said mechanism is operated to supply motive power from said source to said propelling means to effect propulsion, said steering means is cut off from said source.

28. In a mining apparatus having a portable base adapted to travel over the floor of a mine, the provision of power operated propelling means, power operated steering means, and mechanism for controlling the supply of motive power from a source of motive power to both of said power operated means, said mechanism including a control device for controlling the supply of power to said steering means, a control device for controlling the supply of power to said propelling means and means whereby operation of said steering control device for supplying power to said steering means will interrupt the supply of motive power to said propelling means, said power supplying means also including means for supplying power to said control device for said propelling means when said steering control device is operated to interrupt the supply of power to said steering means.

29. In a mining apparatus, the combination comprising propelling means, steering means, a source of motive power, and means for controlling the supply of motive power from said source selectively to said propelling means and said steering means including means for preventing the simultaneous supply of motive power from said source to said propelling means and to said steering means.

30. In a mining apparatus, in combination, fluid operating propelling means, fluid operated steering means, a source of operating fluid, and means for controlling the supply of operating fluid from said source selectively to said propelling means and to said steering means including means preventing the simultaneous supply of operating fluid from said source to said propelling means and to said steering means.

31. In a mining apparatus, in combination, fluid operated propelling means, fluid operated steering means, a plurality of sources of operating fluid, means for controlling the supply of operating fluid from one of said sources to said propelling means, and means for distributing fluid from the other of said sources selectively to said fluid operated propelling means and to said fluid operated steering means including means preventing the simultaneous supply of operating fluid from said second source to said fluid operated propelling means and to said fluid operated steering means.

CLYDE P. BALDWIN.
HARRY H. VANDERZEE.